(12) United States Patent
Fujishima et al.

(10) Patent No.: US 6,963,079 B2
(45) Date of Patent: Nov. 8, 2005

(54) SEMICONDUCTOR CALCULATION DEVICE

(75) Inventors: Minoru Fujishima, Chiba (JP);
Shin-ichi O'Uchi, Kanagawa (JP);
Koichiro Hoh, Tokyo (JP)

(73) Assignee: Japan Science and Technology Agency, Kawaguchi (JP)

( * ) Notice: Subject to any disclaimer, the term of this patent is extended or adjusted under 35 U.S.C. 154(b) by 0 days.

(21) Appl. No.: 10/488,925

(22) PCT Filed: Sep. 10, 2002

(86) PCT No.: PCT/JP02/09187

§ 371 (c)(1),
(2), (4) Date: Mar. 12, 2004

(87) PCT Pub. No.: WO03/025738

PCT Pub. Date: Mar. 27, 2003

(65) Prior Publication Data
US 2004/0266084 A1  Dec. 30, 2004

(30) Foreign Application Priority Data

Sep. 14, 2001 (JP) .............................. 2001-279286

(51) Int. Cl.[7] ............................................. H01L 29/06
(52) U.S. Cl. ........................................ 257/31; 709/238
(58) Field of Search .................... 257/31; 709/238, 709/243, 244; 708/2; 712/203

(56) References Cited

FOREIGN PATENT DOCUMENTS

| JP | 2000-68495 | 3/2000 |
|---|---|---|
| JP | 2001-21932 | 1/2001 |

OTHER PUBLICATIONS

J. R. Pasky, et al.; "Regular arrays of quantum-dot cellular automata "macrocells""; *Journal of Applied Physics*; vol. 87; No. 12; Jun. 15, 2000; pp. 8604-8609.
F.A. Williams; "An expandable single-IC digital filter/Correlator"; *Acoustics, Speech, and Signal Process IEEE International Conference on ICASSP '82*; vol. 7; May 1982; pp. 1077-1080 with cover page.

*Primary Examiner*—Sara Crane
(74) *Attorney, Agent, or Firm*—Armstrong, Kratz, Quintos, Hanson & Brooks, LLP

(57) ABSTRACT

A parallel processor including two processor element groups each configured to simultaneously execute arithmetic operations for states of all logical values expressable by N bits (N is a natural number) and retain results of the arithmetic operation to execute an arithmetic operation equivalent to N qubits; and an exchange unit for data exchange between the two processor element groups. The two processor element groups are each configured to execute an arithmetic operation equivalent to N qubits are connected to each other via the exchange unit to constitute a processor element group configured to execute an arithmetic operation equivalent to (N+1) qubits with 1 qubit extension, and consequently, it becomes possible to execute a large-scale arithmetic operation at high speed without any increase in the time and effort required for designing an integrated circuit for executing the large-scale arithmetic operation.

12 Claims, 4 Drawing Sheets

F I G. 4
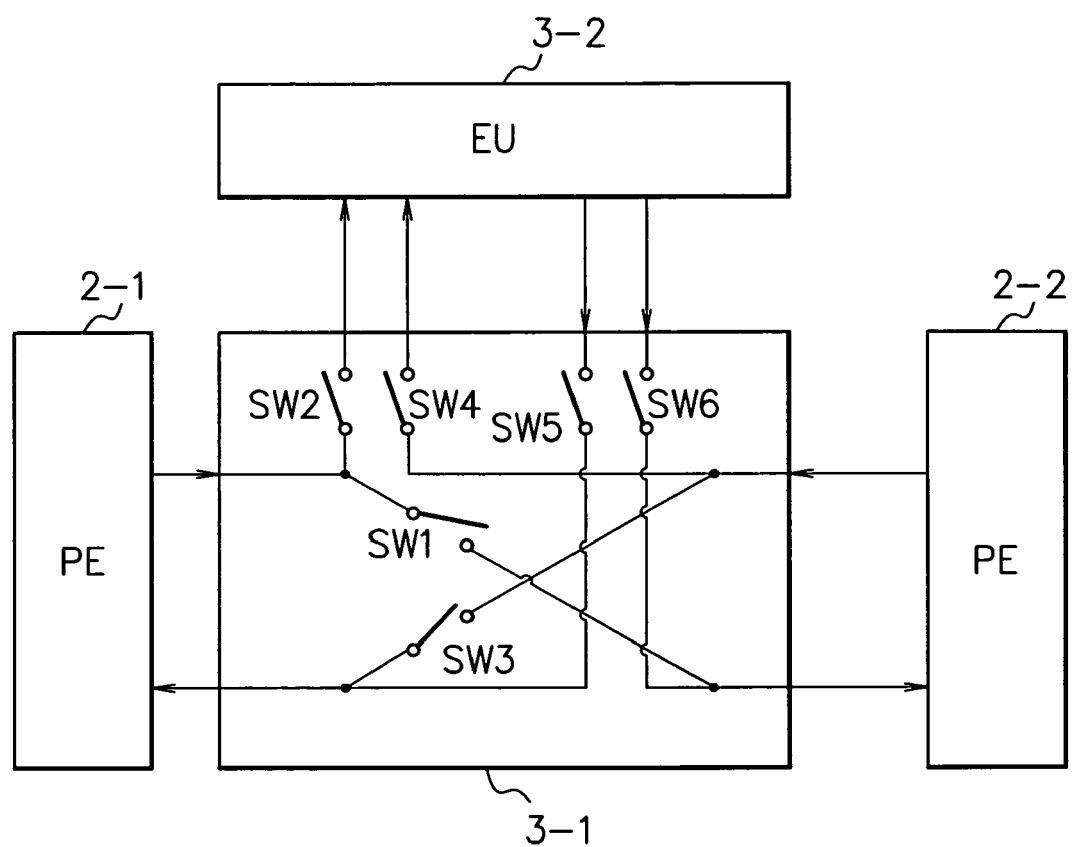

SEMICONDUCTOR CALCULATION DEVICE

FIELD OF INVENTION

The present invention relates to a semiconductor computing device, and is particularly suitable for use in a semiconductor computing device that simultaneously executes arithmetic operations for all logical values expressed by the number of bits operable in the semiconductor computing device.

DESCRIPTION OF THE RELATED ART

Integration density (the number of elements (the number of transistors) that can be integrated) in an integrated circuit is growing exponentially according to "Moore's Law" saying that integration density is doubled every about one year and a half. With this increase in integration density, it is becoming possible to integrate on one semiconductor chip (hereinafter, simply referred to as a "chip") circuits each constituted of a large number of circuit elements that have been thought to be impossible in prior arts to integrate on one chip.

For example, in an integrated circuit of a semiconductor computing device such as a processor, computation throughput has been increased in accordance with the increase in the number of circuit elements that can be integrated on one chip, and consequently, it has become possible to execute a large scale arithmetic operation. Further, for example, an integrated circuit called a System On a Chip (SOC) configured to integrate on one chip a large number of circuit elements for realizing functions of an entire system has come into practical use, the functions of the system being conventionally constituted of a plurality of chips on which circuits having predetermined functions are integrated respectively.

Further, when integration density in an integrated circuit is low, it has conventionally been necessary to omit unnecessary transistors out of transistors constituting the integrated circuit, thereby reducing the number of the transistors of the integrated circuit so that they can be integrated on one chip. However, since the number of transistors that can be integrated on one chip has been increased in accordance with the recent improvement in integration density, the need for the work of omitting unnecessary transistors is decreasing.

However, in spite of the improvement in integration density in the integrated circuit and further the less need for the work of omitting unnecessary transistors as described above, design efficiency of an integrated circuit formed on one chip (time and effort required for designing the integrated circuit) has not been improved as much as integration density.

Specifically, in accordance with the improvement in integration density in an integrated circuit realized by the progress of manufacturing technology, a considerably large amount of time and effort have been required for designing the arrangement of many transistors on a chip and the layout (design) of wiring and so on. As a result, such a problem has arisen that the time and effort required for designing an integrated circuit also increases in accordance with the increase in integration density.

Further, in accordance with the improvement in integration density in an integrated circuit, a large-scale arithmetic operation has become executable in an integrated circuit of a semiconductor computing device such as a CPU, but since a conventionally adopted computational method (algorithm) is used in which computational processing, condition/branch processing, and so on are executed sequentially, using one data value, the time for the arithmetic operation increases in accordance with the scale of the arithmetic operation, which has posed a problem that a large-scale arithmetic operation is not executable at high speed.

The present invention is made in order to solve such problems, and an object thereof is to make it possible to execute a large-scale arithmetic operation at high speed without any increase in the time and effort required for designing an integrated circuit for a large-scale arithmetic operation.

SUMMARY OF THE INVENTION

A semiconductor computing device of the present invention is a semiconductor computing device configured to simultaneously execute arithmetic operations for states of all logical values expressable by (N+1) bits (N is a natural number) and retain results of the respective arithmetic operations, comprising: two N-qubit arithmetic circuit groups each having a plurality of arithmetic circuits and being configured to simultaneously execute arithmetic operations for states of all logical values expressable by N bits and retain results of the arithmetic operations; and an $N^{th}$-qubit switch circuit for exchange of the states of the logical values between the two N-qubit arithmetic circuit groups.

According to the present invention as configured above, only by connecting the two N-qubit arithmetic circuit groups via the $N^{th}$-qubit switch circuit, it is made possible to easily constitute a semiconductor computing device that simultaneously executes arithmetic operations for the states of all the logical values expressable by (N+1) bits and retains the results of the respective arithmetic operations.

BRIEF DESCRIPTION OF THE DRAWINGS

FIG. 4 is a block diagram showing an example of the configuration of an exchange unit.

DETAILED DESCRIPTION OF THE PREFERRED EMBODIMENTS

Hereinafter, an embodiment of the present invention will be explained based on the drawings.

Figure 1:
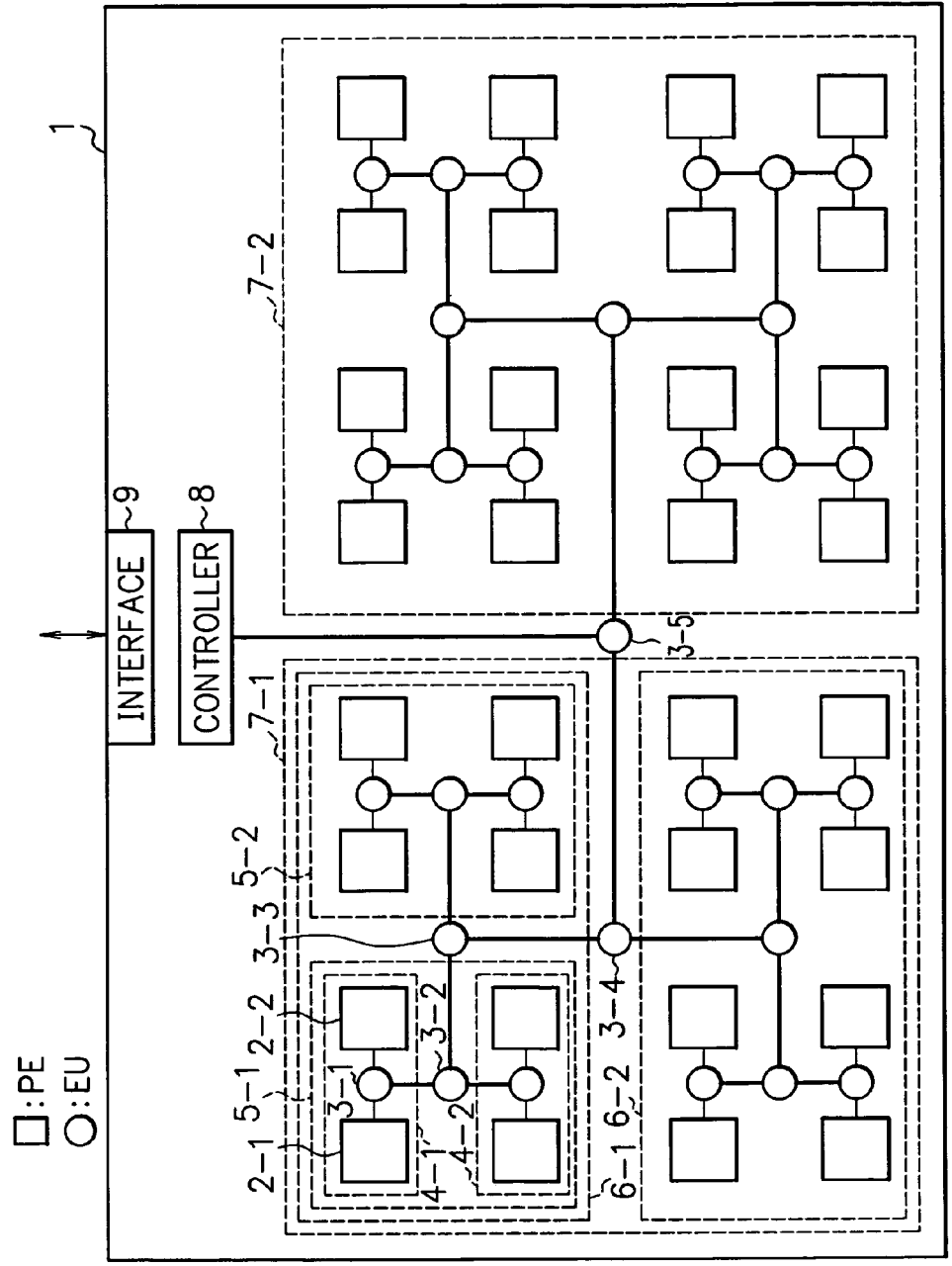
FIG. 1 is a block diagram showing an example of the configuration of a parallel processor to which a semiconductor computing device according to an embodiment of the present invention is applied.

FIG. 1 is a block diagram showing an example of the configuration of a parallel processor to which a semiconductor computing device according to an embodiment of the present invention is applied.

A quantum computer technology is realized in a parallel processor 1 shown in FIG. 1, using an integrated circuit.

First, a quantum computer will be explained.

Unlike a computational method of conventional computers and so on, the quantum computer is a new computational method that utilizes the superposition of states based on quantum mechanics constituted of units of qubits (quantum bits), and was proposed by Feynman as a new computer model. In the quantum computer, one device is used to execute an arithmetic operation utilizing the superposition of the states based on quantum mechanics, and therefore, theoretically, one-time arithmetic operations for all the possible states (data possible to exist as values) can give results of the arithmetic operations for all the aforesaid possible states simultaneously and instantly.

However, on the other hand, since the quantum computer utilizes the superposition of the states based on quantum mechanics, it has been realized only in a physical system in which phenomena based on quantum mechanics are actually observable, for example, physical systems in which nuclear magnetic resonance, microwave, and laser are used, so that large-scale equipment is required. In recent years, an actual physical system in which $2^5$ states exist simultaneously and up to 5 qubits are operable has been proposed in the quantum computer.

However, the quantum computer has to execute an arithmetic operation so that the states change while being kept related with one another (while the states are kept entangled). Therefore, in the quantum computer using an actual physical system, it becomes difficult for phase states that exponentially increase in accordance with the increase in the number of qubits (for example, in case of 10 qubits, the number of the phase states is $2^{10}=1024$) to exist and be retained in one device.

Further, since the quantum computer uses an actual physical system in which phenomena based on quantum mechanics are observable, it needs a complicated work of providing an interface for the exchange of data such as results of the arithmetic operations with an existing electronic circuit, and connectability thereof to the electronic circuit is poor.

Here, since the above-mentioned quantum computer utilizes quantal physical phenomena (the superposition of the states based on quantum mechanics), it is difficult to realize the quantum computer by an integrated circuit, which utilizes classical physical phenomena (classical electromagnetics), as it is. Specifically, it is difficult for one device on an integrated circuit to execute an arithmetic operation utilizing the superposition of the states based on quantum mechanics. However, it is possible for a plurality of devices on an integrated circuit to respectively store a plurality of states superposed based on quantum mechanics and to execute arithmetic operations simultaneously for the stored states based on quantum mechanics.

Therefore, the aforesaid parallel processor 1 shown in FIG. 1 is configured such that a plurality of processor elements (PE) are provided on an integrated circuit, and the plural processor elements store a plurality of states (probability amplitudes of logical values) superposed based on quantum mechanics respectively and simultaneously execute arithmetic operations. Incidentally, FIG. 1 shows as an example the parallel processor 1 that stores $2^5=32$ states equivalent to 5 bits (probability amplitudes of 32 different logical values expressable by 5 bits) and simultaneously executes arithmetic operations for these states, but the present invention is not limited to this. Note that the probability amplitude of a logical value is hereinafter referred to as a "state" for convenience of explanation.

As shown in FIG. 1 described above, the parallel processor 1 has the plural processor elements (PE) (represented by □ drawn by the solid line in FIG. 1) and a plurality of exchange units (EU) (represented by ○ in FIG. 1). Specifically, the parallel processor 1 shown in FIG. 1 that executes an arithmetic operation equivalent to 5 qubits has 32 ($=2^5$) processor elements and 31 ($=2^5-1$) exchange units.

Here, each of the processor elements executes a predetermined arithmetic operation (unitary conversion) for one state out of the 32 states based on the plural states and stores the obtained result of the arithmetic operation. Further, each of the exchange units connects two processor elements to each other, or connects two processor element groups each constituted of the plural processor elements, to each other so that they can communicate with each other, and controls data exchange and so on between the processor elements or between the processor element groups. The processor elements and the exchange units will be described later in detail.

As shown in FIG. 1, in the parallel processor 1, a processor element 2-1 and a processor element 2-2 are connected via an exchange unit 3-1 in an H-shape arrangement. Consequently, a processor element group 4-1 that executes an arithmetic operation equivalent to one qubit is constituted.

Moreover, a processor element group 4-2 that has the same structure as that of the processor element group 4-1 and the processor element group 4-1 are connected via an exchange unit 3-2 in an H-shape arrangement. Consequently, a processor element group 5-1 that executes an arithmetic operation equivalent to 2 qubits is constituted.

Similarly, the processor element group 5-1 and a processor element group 5-2 are connected via an exchange unit 3-3 in an H-shape arrangement to constitute a processor element group 6-1 that executes an arithmetic operation equivalent to 3 qubits, and the processor element group 6-1 and a processor element group 6-2 are connected via an exchange unit 3-4 in an H-shape arrangement to constitute a processor element group 7-1 that executes an arithmetic operation equivalent to 4 qubits. Further, the processor element group 7-1 and a processor element group 7-2 are connected via an exchange unit 3-5 in an H-shape arrangement to constitute a processor element group that executes an arithmetic operation equivalent to 5 qubits, namely, the parallel processor 1.

In short, the parallel processor according to this embodiment is configured such that processor element groups (processor elements when N=1) each executing an arithmetic operation equivalent to N qubits (N is a natural number) are connected to each other via an exchange unit in an H-shape arrangement to constitute a processor element group that executes an arithmetic operation equivalent to (N+1) qubits with 1 qubit extension. Then, the processor element groups are recursively connected via an exchange unit in an H-shape arrangement to constitute a parallel processor that executes an arithmetic operation equivalent to a desired number of qubits. Here, the aforesaid processor element functions as an arithmetic circuit of the present invention and the exchange unit functions as a switch circuit of the present invention. Further, the processor element group functions as an arithmetic circuit group of the present invention.

Further, the parallel processor 1 has a controller 8 that controls the plural processor elements and the plural exchange units in the parallel processor 1, and an interface 9 for data exchange or the like between the parallel processor 1 and external circuits (devices) and so on connected thereto.

Next, the processor element (PE) will be explained in detail.

Note that the processor elements provided in the above-described parallel processor 1 shown in FIG. 1 have the same structure, and therefore, the processor element 2-1 will be explained below as an example.

Figure 2:
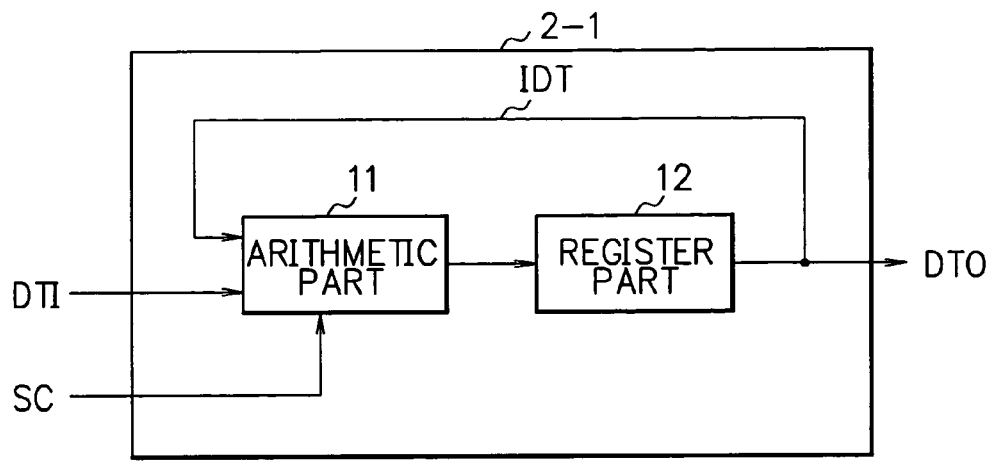
FIG. 2 is a block diagram showing an example of the configuration of a processor element.

FIG. 2 is a block diagram showing an example of the configuration of the above-mentioned processor element 2-1 shown in FIG. 1.

In FIG. 2, the processor element 2-1 is composed of an arithmetic part 11 and a register part 12.

According to an instruction supplied from the controller 8 shown in FIG. 1 via a not-shown signal line, the arithmetic part 11 executes a predetermined arithmetic operation (unitary conversion) for any one state, out of 32 states, for which the processor element 2-1 is to execute an arithmetic operation. The arithmetic part 11 is supplied from the register part 12 with internal data IDT indicating the one state, out of the 32 states, for which an arithmetic operation is to be executed, and is supplied with input data DTI indicating another state different from the above-mentioned one state from another processor element (processor element group) via the exchange unit 3-1.

Here, the above-mentioned internal data IDT and input data DTI are probability amplitudes of logical values as described above, and the probability amplitude is expressed using a complex number. Further, since the arithmetic operation executed in the arithmetic part 11 is unitary conversion, unitarity is constantly maintained in the arithmetic operation executed by the arithmetic part 11.

For example, when the state for which the processor element 2-1 is to execute an arithmetic operation is a state of a logical value "00001" among the 32 states, the probability amplitude of the logical value "00001" is supplied to the arithmetic part 11 as the internal data IDT, and the probability amplitude of a logical value different from the logical value "00001" (for example, "00000", "00011", or the like) is supplied to the arithmetic part 11 as the input data DTI.

Further, a coefficient signal SC is supplied to the arithmetic part 11 from the controller 8 via the exchange unit 3-1.

The arithmetic part 11 executes a product-sum operation of the complex numbers for the plural states (the probability amplitudes represented by the complex numbers) supplied as the internal data IDT and the input data DTI, using a coefficient value supplied as the aforesaid coefficient signal SC. Then, the arithmetic part 11 outputs states obtained as a result of the arithmetic operations (probability amplitudes expressed by complex numbers) to the register part 12.

The register part 12 stores the results of the arithmetic operations outputted from the arithmetic part 11, according to an instruction supplied from the controller 8 shown in FIG. 1 via a not-shown signal line. The register part 12 also outputs the stored result of the arithmetic operations to the arithmetic part 11 as the internal data IDT, and to another processor element (processor element group) as output data DTO via the exchange unit 3-1, according to the instruction supplied via the not-shown signal line.

Figure 3:
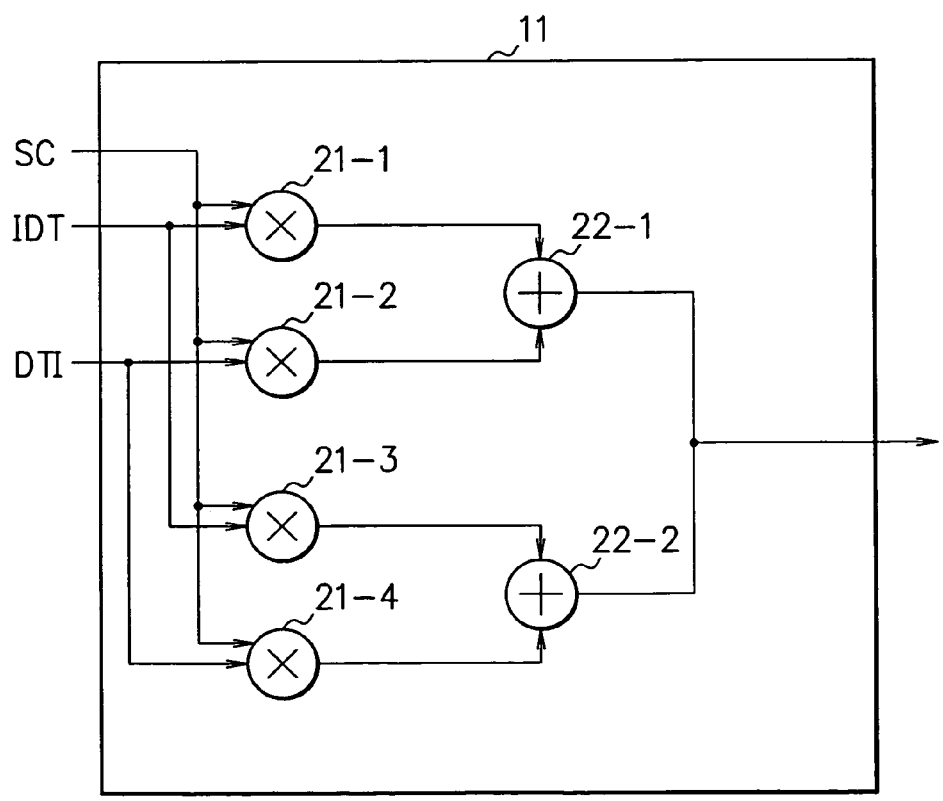
FIG. 3 is a block diagram showing an example of the configuration of an arithmetic part in the processor element in detail.

FIG. 3 is a block diagram showing an example of the configuration of the above-described arithmetic part 11 shown in FIG. 2 in detail.

In FIG. 3, the arithmetic part 11 is constituted of four multipliers 21-1 to 21-4 and two adders 22-1 to 22-2.

The multipliers 21-1 to 21-4 are supplied with the coefficient signal SC as well as the internal data IDT or the input data DTI. The multipliers 21-1 to 21-4 multiply a coefficient value supplied as the coefficient signal SC by a real part and an imaginary part of the probability amplitude of one logical value, out of the 32 logical values, supplied as the internal data IDT, and by a real part and an imaginary part of the probability amplitude of the logical value supplied as the input data DTI (the logical value different from the aforesaid one logical value), respectively, and output the results thereof to the adders 22-1, 22-2 on a subsequent stage that are connected thereto.

The adder 22-1 adds the multiplication results outputted from the multipliers 21-1 and 21-2 respectively. Further, the adder 22-2 adds the multiplication results outputted from the multipliers 21-3 and 21-4 respectively. Then, the adders 22-1, 22-2 output the addition results to the aforesaid register part 12 shown in FIG. 2.

The arithmetic part 11 is configured as described above, so that the arithmetic part 11 executes the product-sum operation of the plural states (probability amplitudes), which are supplied as the internal data IDT and the input data DTI, and the coefficient value supplied as the coefficient signal SC.

Next, the exchange unit (EU) will be explained in detail.

Note that the exchange units shown in FIG. 1 provided in the parallel processor 1 have the same configuration, and therefore, the exchange unit 3-1 will be explained below as an example.

FIG. 4 is a block diagram showing an example of the configuration of the exchange unit (EU) 3-1 shown in FIG. 1.

As shown in FIG. 4, the exchange unit 3-1 is constituted of six switching elements SW1 to SW6.

The switching elements SW1 and SW2 are connected in series between a data output terminal of the processor element 2-1 and a data input terminal of the processor element 2-2, and between the data output terminal of the processor element 2-1 and a first data input terminal of the exchange unit 3-2, respectively. Similarly, the switching elements SW3 and SW4 are connected in series between a data output terminal of the processor element 2-2 and a data input terminal of the processor element 2-1, and between the data output terminal of the processor element 2-2 and a second data input terminal of the exchange unit 3-2, respectively. Further, the switching elements SW5 and SW6 are connected in series between the first and second data output terminals of the exchange unit 3-2 and the data input terminals of the processor element 2-1 and 2-2, respectively.

By the switching operation of the switching elements SW1 and SW2, one state (probability amplitude of the logical value), out of the 32 states, outputted as the output data DTO from the processor element 2-1 is supplied or is not supplied to the processor element 2-2 and the exchange unit 3-2 respectively.

Similarly, by the switching operation of the switching elements SW3 and SW4, one state, out of the 32 states, outputted as the output data DTO from the processor element 2-2 is supplied or is not supplied to the processor element 2-1 and the exchange unit 3-2 respectively.

Further, by the switching operation of the switching elements SW5 and SW6, the remaining states outputted from the exchange unit 3-2, out of the 32 states except the aforesaid states for which the arithmetic operations are to be executed in the processor elements 2-1, 2-2, are supplied or are not supplied to the processor elements 2-1 and 2-2 respectively.

The exchange unit 3-1 is configured as described above to control a data supply route by appropriately opening/closing the switching elements SW1 to SW6, so that it is possible to supply the 32 states to the plural processor elements constituting the parallel processor 1 respectively.

Incidentally, FIG. 4 shows only data signal lines for mutual data exchange between the processor elements 2-1, 2-2 and the exchange unit 3-2, but signal lines for supplying instructions and for supplying a coefficient as the coefficient signal SC from the aforesaid controller 8 shown in FIG. 1 may be provided in the exchange unit (EU).

Next, commands used in the parallel processor 1 in this embodiment will be explained. Only by using the following nine commands, it is made possible to execute any arithmetic operation in the parallel processor 1 of this embodiment.

(1) PHAS (Phase Shift: 1-qubit Phase Shifting Operation)
To rotate the phase of a designated qubit (2) ROT (Rotation: 1-qubit Rotating Operation)
To rotate a designated qubit (3) CPHAS (Controlled Phase Shift: Controlled 1-qubit Phase Shifting Operation)
To rotate the phase of a designated qubit when the value of a qubit indicated by a control value is "1" and to execute an arithmetic operation for retaining a previous value (identity transformation) when the value of the qubit is "0"

(4) CROT (Controlled Rotation: Controlled 1-qubit Rotating Operation)
To rotate a designated qubit when the value of a qubit indicated by a control value is "1" and to execute an arithmetic operation for retaining a previous value (identity transformation) when the value of the qubit is "0"

(5) HALT (Arithmetic Operation Halt Command)
To halt an arithmetic operation and transit to an idle state (6) INIT (Initialize: qubit Initializing Operation)
To set only a real value of probability amplitude of a state in which the values of all qubits are "0" to 1 and to set others to 0

(7) PCAL (Probability Calculation)
To calculate probability derived by squaring the absolute value of probability amplitude (8) PSUM (Probability Sum)
To calculate the sum of probabilities of logical values in which only the value of a designated qubit is different (9) REDUCE (State Reducing Operation)
To compare the magnitude of probabilities of logical values in which only the value of a designated qubit is different and maintain probability amplitude or set probability amplitude to "0" according to the comparison result Next, the operation of the aforesaid parallel processor 1 in this embodiment shown in FIG. 1 will be explained.

Note that, for convenience of explanation, it is assumed in the following explanation that the state for which an arithmetic operation is executed in the processor element 2-1 shown in FIG. 1 is the state of a logical value "XXX00" (X is Don't care), and the state for which an arithmetic operation is executed in the processor element 2-2 is the state of a logical value "XXX01" (X is Don't care).

For example, it is assumed that the arithmetic operations are executed for the least significant qubit. At this time, the switching elements SW1 and SW3 in the exchange unit 3-1 are closed and the other switching elements SW2, SW4 to SW6 are opened.

Consequently, part of the states (probability amplitudes) of the logical values "XXX00" stored in the register part 12 in the processor element 2-1 (for example, that obtained by multiplying a predetermined coefficient value) is supplied to the arithmetic part 11 in the processor element 2-2 via the switching element SW1 in the exchange unit 3-1. Similarly, part of the states (probability amplitudes) of the logical values "XXX01" stored in the register part 12 in the processor element 2-2 is supplied to the arithmetic part 11 in the processor element 2-1 via the switching element SW3 in the exchange unit 3-1. Further, a coefficient value according to the arithmetic operations is supplied as the coefficient signal SC to each of the processor elements 2-1, 2-2 from the controller 8.

The arithmetic part 11 in the processor element 2-1 executes a product-sum operation for the states (probability amplitudes), using the state of the logical value "XXX00" stored in the own register part 12, part of the states of the logical values "XXX01" supplied from the processor element 2-2, and the coefficient value supplied as the coefficient signal SC. Consequently, the state of the logical value "XXX00" that has undergone the arithmetic operation is obtained as the result of the arithmetic operation. Further, the arithmetic part 11 in the processor element 2-2 also executes a similar product-sum operation simultaneously with the product-sum operation in the arithmetic part 11 in the processor element 2-1, so that the state of the logical value "XXX01; " that has undergone the arithmetic operation is obtained as the result of the arithmetic operation. Note that since qubits as objects of the arithmetic operations in the processor elements 2-1, 2-2 are the same, the arithmetic operations of the states executed therein are the same.

The same arithmetic operation as that executed in the processor elements 2-1, 2-2 as described above is executed simultaneously in all the processor elements included in the parallel processor 1. Consequently, the parallel processor 1 simultaneously executes arithmetic operations for the least significant qubit regarding 32 states equivalent to 5 qubits, so that the results of all the arithmetic operations can be obtained quickly.

As for the arithmetic operation for a qubit other than the least significant qubit, the basic operation is the same except that the open/close control over the switching elements SW1 to SW6 in the exchange unit is different, and that a processor element that supplies part of the state of the logical value is a corresponding processor element (to execute an arithmetic operation for a logical value in which only a logical value of the object qubit of the arithmetic operation is different) of a different processor element group, and therefore, explanation thereof will be omitted.

As detailed above, according to this embodiment, two processor element groups (processor elements when N=1) are connected to each other via an exchange unit, the two processor element groups simultaneously executing arithmetic operations for states of different logical values expressable by N bits (N is a natural number) and each having $2^N$ processor elements that retain results of arithmetic operations, to execute an arithmetic operation equivalent to N qubits, so that a processor element group executing an arithmetic operation equivalent to (N+1) qubits with 1 qubit extension is constituted. Then, the processor element groups are connected recursively via an exchange unit, so that a parallel processor that executes an arithmetic operation equivalent to a predetermined number of qubits is constituted.

Consequently, it is possible to design even a parallel processor that executes a large-scale arithmetic operation only by recursively connecting processor element groups via an exchange unit, so that it is possible to easily design a parallel processor that executes a predetermined arithmetic operation, without any increase in the time and effort required for the designing.

Especially the configuration in which the processor element groups are recursively connected via the exchange unit in an H-shape arrangement allows vertically or bilaterally symmetrical arrangement of the processor element groups, which greatly facilitates the designing and also enables enhancement in mounting efficiency on an integrated circuit.

Further, two processor element groups equivalent to N qubits, which simultaneously execute arithmetic operations for states of all $2^N$ logical values expressable by N bits to retain the results of the arithmetic operations, are used to constitute a processor element group equivalent to (N+1) qubits, so that it is possible to simultaneously execute arithmetic operations for states of all $2^{N+1}$ logical values expressable by (N+1) bits to constantly retain the results of the arithmetic operations. Therefore, the results of the arithmetic operations for all the logical values can be obtained only by one-time simultaneous arithmetic operations for all the logical values without any sequential arithmetic operations using one data value, which has been conducted in a prior art, and consequently, high speed execution of a large-scale arithmetic operation is possible.

In the above-described embodiment, the processor element groups are arranged in an H shape with the exchange unit interposed therebetween when they are recursively connected to each other, but the present invention is not limited to this arrangement. However, the symmetrical arrangement and connection of the processor element groups with respect to the exchange unit allows very easy and rational designing.

Figure 5:
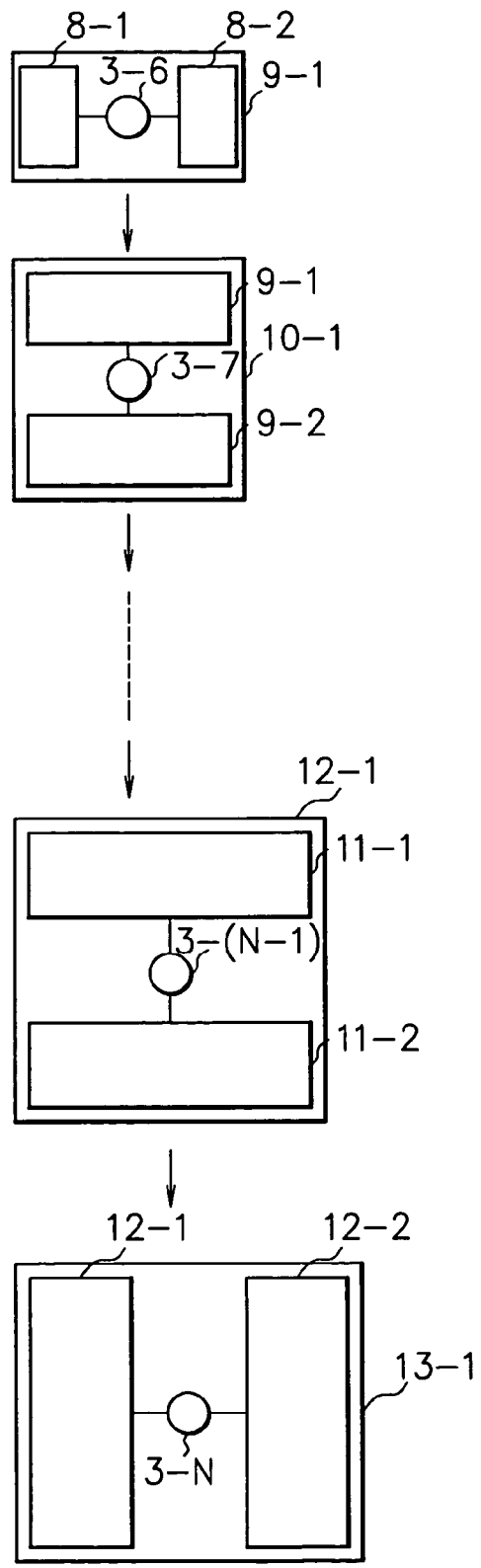
FIG. 5 is a view for explaining a method of constituting a semiconductor computing device that executes an arithmetic operation equivalent to an arbitrary number of qubits.

Further, in the above-described embodiment, the semiconductor computing device that executes an arithmetic operation equivalent to 5 qubits is shown, but the present invention is not limited to the semiconductor computing device that executes an arithmetic operation equivalent to 5 qubits, and is applicable to a semiconductor computing device that executes an arithmetic operation equivalent to an arbitrary number of qubits in a manner shown in FIG. 5.

FIG. 5 is a view for explaining a method of constituting a semiconductor computing device that executes an arithmetic operation equivalent to an arbitrary number of qubits.

In FIG. 5, 8-1 and 8-2 denote processor element groups each configured to execute an arithmetic operation equivalent to 5 qubits and constituted of the two processor element groups 7-1, 7-2 shown in FIG. 1 each configured to execute an arithmetic operation equivalent to 4 qubits. The above-mentioned processor element groups 8-1, 8-2 are connected via an exchange unit 3-6 in, for example, an H-shape arrangement to constitute a processor element group 9-1 that executes an arithmetic operation equivalent to 6 qubits, and the processor element group 9-1 and a processor element group 9-2 are connected via an exchange unit 3-7 in an H-shape arrangement to constitute a processor element group 10-1 that executes an arithmetic operation equivalent to 7 qubits.

Similarly, processor element groups are recursively connected via an exchange unit to increase the number of operable qubits.

For example, in order to constitute a processor element group that executes an arithmetic operation equivalent to N qubits, processor element groups 12-1, 12-2 are connected to each other via an exchange unit 3-N, each of the processor element groups 12-1, 12-2 having processor element groups 11-1, 11-2 each of which executes an arithmetic operation equivalent to (N−2) qubits, and an exchange unit 3−(N−1), and being configured to execute an arithmetic operation equivalent to (N−1) qubits, so that a processor element group 13-1 that executes an arithmetic operation equivalent to N qubits is constituted.

INDUSTRIAL APPLICABILITY

As explained hitherto, according to the present invention, a semiconductor computing device that simultaneously executes arithmetic operations for states of all logical values expressable by (N+1) bits and retains the results of the respective arithmetic operations is constituted of two N-qubit arithmetic circuit groups, each of which simultaneously executes arithmetic operations for states of all logical values expressable by N bits and retains the results of the arithmetic operations, and an $N^{th}$-qubit switch circuit for the exchange of the states of the logical values between the two N-qubit arithmetic circuit groups.

Thus, even a semiconductor computing device configured to execute a large-scale arithmetic operation can be designed only by connecting arithmetic circuit groups recursively via a switch circuit, so that it is possible to easily design a semiconductor computing device configured to execute a large-scale arithmetic operation without any increase in time and effort required for designing. Moreover, the semiconductor computing device includes two N-qubit arithmetic circuit groups each configured to simultaneously execute arithmetic operations for the states of all the logical values expressable by N bits and retain the results of the arithmetic operation, so that it is possible to simultaneously execute arithmetic operations for the states of all the logical values expressable by (N+1) bits and constantly retain the results of the respective arithmetic operations, which makes it possible to obtain the results of the arithmetic operations for all the logical values only by one-time simultaneous arithmetic operations for all the logical values. Therefore, it is possible to execute a large-scale arithmetic operation at high speed.

What is claimed is:

1. A semiconductor computing device configured to simultaneously execute arithmetic operations for states of all logical values expressable by (N+1) bits (N is a natural number) and retain results of the respective arithmetic operations, comprising:

two N-qubit arithmetic circuit groups each having a plurality of arithmetic circuits and each being configured to simultaneously execute arithmetic operations for states of all logical values expressable by N bits and retain results of the arithmetic operations; and an $N^{th}$-qubit switch circuit for exchange of the states of the logical values between said two N-qubit arithmetic circuit groups.

2. The semiconductor computing device according to claim 1, wherein each of said N-qubit arithmetic circuit groups has $2^N$ arithmetic circuits, and wherein said arithmetic circuits execute arithmetic operations for one state and another different state respectively out of the states of all the logical values expressable by N bits and retain the results of the arithmetic operations.

3. The semiconductor computing device according to claim 1, wherein each of said two N-qubit arithmetic circuit groups has an $(N 1)^{th}$-qubit switch circuit, and wherein said $(N 1)^{th}$-qubit switch circuit of one of said two N-qubit arithmetic circuit groups further enables exchange of the states of the logical values with the other one of said N-qubit arithmetic circuit groups.

4. The semiconductor computing device according to claim 3, wherein said $(N 1)^{th}$-qubit switch circuit has six switching elements.

5. The semiconductor computing device according to claim 3, wherein one of 1-qubit arithmetic circuit groups of said N-qubit arithmetic circuit groups includes:

said two arithmetic circuits configured to respectively execute arithmetic operations for different logical value states of a binary logical value expressed by one bit; and a first-qubit switch circuit configured to connect said two arithmetic circuits to allow exchange of the states of the logical values between said two arithmetic circuits and between said two arithmetic circuits and the other one of said 1-qubit arithmetic circuit groups.

6. The semiconductor computing device according to claim 1, wherein said two N-qubit arithmetic circuit groups are disposed on both sides respectively, and said $N^{th}$-qubit switch circuit is disposed between said two N-qubit arithmetic circuit groups.

7. The semiconductor computing device according to claim 1, wherein each of said arithmetic circuits includes:

an arithmetic part configured to execute an arithmetic operation, using a state of a supplied logical value; and a register part configured to store a result of the arithmetic operation by said arithmetic part.

8. The semiconductor computing device according to claim 7, wherein said arithmetic part executes an arithmetic operation of probability amplitude expressed by a complex number representing the state of the logical value.

9. The semiconductor computing device according to claim 8, wherein said arithmetic part executes a complex number product-sum operation, using the probability amplitude representing the state of the supplied logical value and a supplied coefficient value.

10. The semiconductor computing device according to claim 9, wherein said arithmetic part includes four multipliers and two adders.

11. The semiconductor computing device according to claim 9, wherein said arithmetic part maintains unitarity of the probability amplitude representing the state of the logical value.

12. The semiconductor computing device according to claim 1, wherein, when N bits are extended to (N+1) bits, said two N-qubit arithmetic circuit groups execute arithmetic operations corresponding to different logical values of a binary logical value of the extended bits.

* * * * *